Feb. 25, 1964  K. SCHMITT ETAL  3,122,541
PROCESS FOR THE PRODUCTION OF MELAMINE USING THE
ELECTRICAL RESISTANCE HEAT GENERATED IN SOLID
MATERIAL IN CONTACT WITH UREA
Filed May 7, 1962
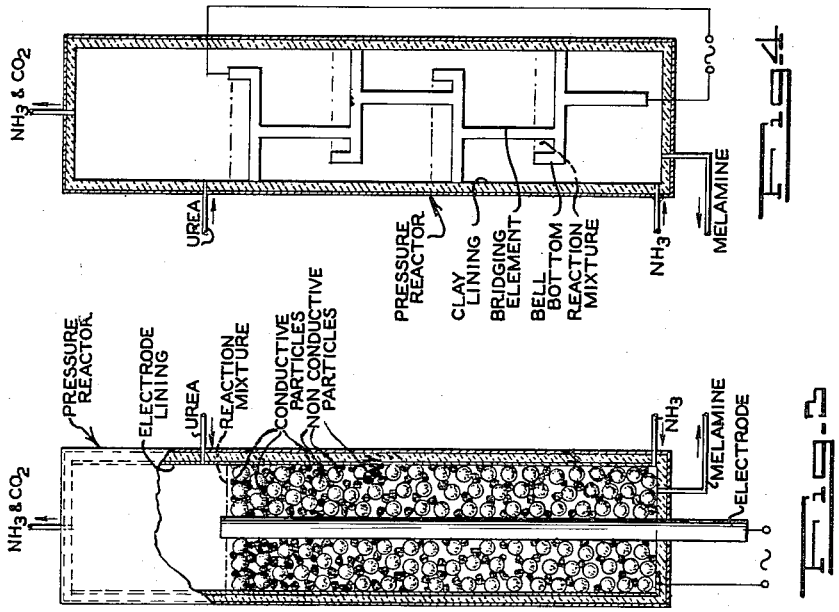
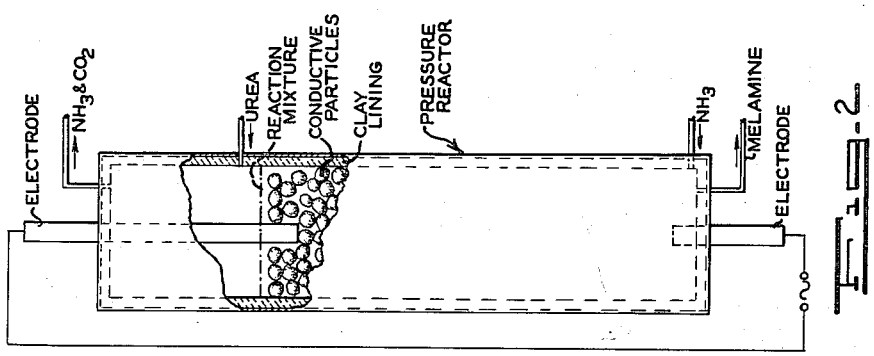
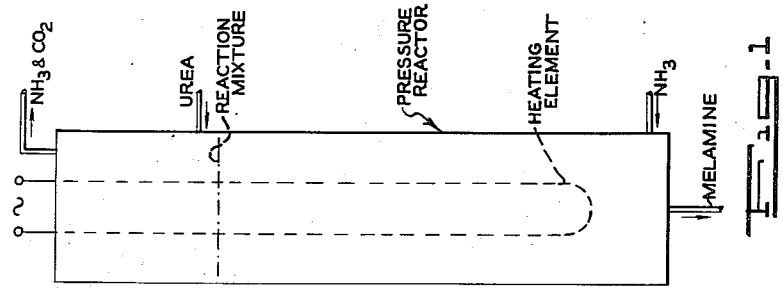
INVENTORS
KARL SCHMITT
JOSEF DISTELDORF
HANS-JURGEN HAAGE 3,122,541
PROCESS FOR THE PRODUCTION OF MELAMINE USING THE ELECTRICAL RESISTANCE HEAT GENERATED IN SOLID MATERIAL IN CONTACT WITH UREA
Karl Schmitt, Herne, Westphalia, and Josef Disteldorf and Hans-Jurgen Haage, Wanne-Eickel, Germany, assignors to Hibernia-Chemie G.m.b.H., Wanne-Eickel, Germany, a corporation of Germany
Filed May 7, 1962, Ser. No. 193,024
Claims priority, application Germany May 9, 1961
11 Claims. (Cl. 260—249.7)

The present invention relates to a process for the production of melamine by heating urea under pressure, and more particularly to such a process using the electrical resistance heat generated in solid material in contact wtih urea for the desired purposes.

Conventionally, melamine is produced by heating urea under pressure, as for example by introducing urea, preferably in the form of a melt, into a pressurized reactor, whereby through external heating of the reactor, simultaneously with the autogenous or self-generated pressure within the reactor, the required reaction conditions are brought about. Usually, the temperature is maintained at about 400° C., and for sufficient degrees of conversion, a time of stay of about 30 minutes up to 2 hours is necessary. In order to stabilize the reaction, pressures of about 100 atmospheres are generally used.

It is also known that the reaction of urea under pressure to form melamine may be favorably influenced by the addition of certain catalysts. For example, the addition of certain metals, particularly iron, in the form of the pure metal, or of the oxide, or of a salt thereof, etc., enhances the reaction.

Up to the present, melamine has not been produced successfully on a large scale, using the afore-described processes. Essentially, two main difficulties exist which prevent the application of the conventional melamine processes to large scale industrial undertakings, i.e. the corrosion problem and, closely connected therewith, the problem of supplying sufficient energy or heat for carrying out the reaction in the desired manner. It is known in this connection that the reaction energy $\Delta H_{400°C.} = +70$ kcal. per formula conversion for the reaction equation:

$6NH_2CONH_2 \rightarrow 1$ melamine $+3CO_2+6NH_3$

It is obvious from the foregoing that in order to heat the urea and in order to provide sufficient reaction heat for the conversion to melamine, considerable energy is required, which energy must be supplied to the urea in a more or less complete and direct manner. Therefore, with respect to the reaction vessel used, a very good heat exchange must be provided. Particularly because of the prevailing pressure conditions for carrying out the melamine reaction, such heat exchange may only be provided where the reaction vessel is constructed of metallic materials. Additionally, sufficient heat exchange surface must exist between the reaction vessel and the urea melt in order to uniformly distribute the heat for the desired reaction. However, it is well recognized that under the particular reaction conditions of the melamine formation, metallic materials are very strongly attacked, and therefore the reaction vessels become corroded and thus lose their attractiveness. This objectionable result is particularly applicable where iron reaction vessels are used.

Attempts have been made to overcome this drawback of corrosion by lining the reaction vessel with pure metals, such as gold, silver, titanium, tantalum, etc. and also by using linings of highly alloyed steel, such, as for example, those which contain nickel, chromium, vanadium, molybdenum, etc., with iron being present only in comparatively trace amounts. Corrosion protection afforded in this manner, however, is incomplete, since such reaction vessels have only limited capacity due to the high cost of the metallic materials employed. Therefore, attempts to line the reaction vessel with pure or noble metals or highly alloyed steels must fail where large scale industrial processes are concerned, due to the prohibitive cost for the installations alone.

Sporadically, attempts have been made to provide reaction vessels for the melamine reaction wherein the vessel is lined with glass. Of course, for widespread industrial processes, developments of this kind must be eliminated from consideration, especially because of the impracticality of construction and the lack of durability in use of glass-lined apparatus.

In summary, it must be concluded that while numerous attempts have been made to solve the problem of carrying out the production of melamine by way of specialized reactors containing linings of non-corrosive materials, these attempts have not led to any success in practice because of the impracticality and/or economic unfeasibility of the undertakings contemplated.

As for the use of non-metallic materials in place of metallic materials for the reaction vessel, up to the present this has not been considered due to the fact that no provision was known for introducing the necessary total energy and heat required for the conversion, in a sufficiently effective manner to permit industrial scale apparatus to be operated. While it has ben proposed already to line with graphite the reaction vessel which is to be charged with the melamine forming substance, this technique is objectionable mostly because of the insulation properties of such non-metal. Specifically, heat cannot be transferred to the reaction mixture through the walls of the reaction vessel as in the case of metallic vessels, but instead, the required heat must be supplied to the individual ingredients of the reaction mixture themselves. In this regard, such heat may be contributed by introducing into the reaction vessel ammonia which has been pre-heated to a temperature between about 500 and 550° C. It is self evident that this procedure still cannot solve the problem of providing as uniform as possible a heat supply nor a sufficient heat supply for the purposes intended. By utilizing the foregoing procedure of introducing pre-heated ammonia, the attainable conversions to melamine are extremely low, and of course, this procedure suffers from the obvious drawback that the pre-heating of ammonia to such high temperatures is beset with the danger of a decomposition or explosion.

It is an object of the present invention to overcome the foregoing drawbacks and to provide a process for the production of melamine using the specific electrical resistance heat generated in solid material in contact with urea for the desired purposes.

It is a further object of the invention to provide a process for the production of melamine by heating urea under pressure in direct contact with a solid, electrical resistance material, by passing an electric current through said electrical resistance material to generate heat therein as a function of the electrical resistance thereof to the current being passed therethrough, and transferring said heat to the urea by direct contact therewith.

Other and further objects of the invention will become apparent from a study of the within specification and the accompanying drawings in which:

FIG. 1 is a schematic elevation of a vertical reactor through which urea and ammonia are passed in counter-current to one another, the heating being carried out by passing a current through an electrical resistance element extending into the reactor and immersed in the reaction mixture;

FIG. 2 is a schematic elevation of a vertical reactor in accordance with a further embodiment of the invention in which a pair of opposing electrodes are introduced through the top and bottom ends of the closed reactor, such electrodes being maintained in electrically conductive contact by the provision for electrically conductive resistance particles maintained in contact with one another throughout the extent of the reactor between the electrodes;

FIG. 3 is a schematic elevation of a vertical reactor in accordance with another embodiment of the invention in which a centrally disposed electrode is provided which is inserted upwardly through the bottom wall of the reactor, the counter-electrode therefor being defined by an electrode lining on the interior wall of the reactor, contact between the electrode surfaces being maintained by the presence of electrically conductive resistance particles intermixed with less conductive or non-conductive particles; and FIG. 4 is a schematic elevation of a vertical reactor in accordance with a further embodiment of the invention in which the solid, electrical resistance material takes the form of a series of built-in installations, of the bell-bottom type, interconnected with one another by means of vertically extending electrode elements so as to provide a series connection through the reaction mixture.

It has been found in accordance with the present invention that an improved process for the production of melamine by heating urea under pressure may be provided, which comprises carrying out the heating of urea under pressure in direct contact with a solid, electrical resistance material, by passing an electric current through said electrical resistance material to generate heat therein as a function of the electrical resistance thereof to the current being passed therethrough, and transferring said heat to the urea by direct contact therewith, whereby to form melamine. Specifically, the heating is carried out in a closed zone having a non-metallic lining made from a corrosion-insensitive material, in order to avoid corrosion. Temperatures may be used which range between about 300 and 500° C., while pressures may be used which range between about 50 and 300 atmospheres absolute. For best results, the electric current used is in the form of alternating current.

In accordance with a preferred embodiment of the invention, the heating is carried out in the presence of ammonia, and the urea is passed along a reaction path in counter-current to the ammonia, whereby melamine produced under the reaction conditions may be recovered from one end of the reaction path while carbon dioxide and ammonia produced as by-products may be recovered from the other end of the reaction path.

Suitably, the malamine production may be carried out in the presence of a metallic catalyst if desired, such as a catalyst consisting of a base metal, a base metal oxide, and/or a base metal salt, such as iron oxide, etc.

Advantageously, the melamine formed by the reaction is recovered in liquid form while the carbon dioxide and ammonia are recovered in gaseous form, and for this reason a vertically extending reactor is preferred, wherein the urea is added to the upper end thereof and the ammonia is added to the lower end thereof, whereby the heavier urea will flow downwardly while the gaseous ammonia will bubble upwardly through the reaction mixture for maximum contact between the ingredients.

Advantageously, the carbon dioxide and ammonia in gaseous form may be recovered from the upper end of the vertical reactor and conducted to a cooling step, preferably without change in pressure, and thereafter converted to urea in the conventional manner, so that the urea formed thereby may be recycled back to the melamine process step, for the conservation and efficiency of the over-all reaction.

In accordance with the preferred embodiment of the invention, an improvement is provided in the process for the production of melamine by heating urea under pressure in a closed reaction zone having a non-metallic lining, made from corrosion-insensitive material, such improvement contemplating the carrying out of the heating of the urea melt under pressure in the presence of gaseous ammonia, in direct contact with a non-metallic corrosion-insensitive solid electrical resistance material to produce melamine, carbon dioxide, and ammonia, by passing an alternating current through the electrical resistance material to generate heat therein as a function of the electrical resistance thereof to the current being passed therethrough, and transferring said heat to the urea by direct contact therewith, the temperature being maintained between about 300 and 500° C., and preferably 350 to 450° C., and the pressure being maintained between about 50 and 300 atmospheres absolute, and preferably about 100 atmospheres absolute. The reaction may be carried out for a period of from about 2 minutes to 2 hours, although a period of at least 30 minutes is desirable, unless stronger reaction conditions and/or the use of a catalyst is contemplated. Alternating current of about 50 Hertz (50 cycles per second) has been found to be particularly suitable and where a catalyst is to be used, 0.5% by weight of iron oxide has proved to be efficient enough for the reaction to be maintained at a lower temperature.

The solid, electrical resistance material may be any carbonaceous material, such as carbon or graphite, including carbon in the form of a shaped body.

In accordance with an alternate embodiment of the invention, in place of a simple resistance heating element immersed in the reaction mixture, opposing electrodes may be used which are in direct electrically conductive contact with one another by reason of the presence of individual resistance particles disposed in the reaction mixture bath or melt in direct electrically conductive contact with one another as well as with the opposing electrodes. Such material may be used alone or may be admixed with individual additive particles of less electrical conductivity than said resistance particles or of non-conductive nature. Thus, the solid, electrical resistance material may take the form of any solid shaped element which may be disposed in a bath of the urea or the reaction mixture, which material is insensitive to corrosion and capable of conducting sufficient current therethrough for generating the desired heat for the melamine reaction.

Especially where the urea is passed downwardly through a vertical zone in counter-current to ammonia used for stabilizing the reaction, and where carbon dioxide and ammonia are recovered in gaseous form from the upper portion of the reaction zone while the melamine is recovered in liquid form from the lower portion of said zone, the alternate embodiments of using resistance material in the form of individual resistance particles in direct electrically conductive contact with one another disposed in the reaction mixture may be suitably employed. Conveniently, the resistance material where admixed with individual additive particles of less electrical conductivity than such resistance particles will permit a more regulated control of the heat generation, if the ratio of the resistance particles to the additive particles changes along the extent of the zone. Thus, the amount of resistance particles may decrease while the amount of additive particles increases in the direction of flow of the urea downwardly through the vertical reactor, thereby resulting in an increase in the over-all resistance to passage of electrical current therealong and a corresponding increase in the heat generated. Similar results may be achieved where the additive particles are non-conductive particles, less of these particles being necessary to effect the same order of change along the extent of the reaction mixture in the vertical reactor.

Thus, the present invention permits the required energy to be supplied to the urea in such a manner that the entire corrosion problem which beset the use of metallic reactors is completely eliminated. Practically speaking, this is only possible where the energy is introduced by means of separate electrical resistance heating elements, in suitable form, positioned in the reactor for generating heat by way of electricity. The lining of the reaction vessel, as well as other parts of the apparatus, which may be exposed to corrosion, may be made of non-metallic materials which are inert with respect to the reactants under the reaction conditions, since the supply of energy necessary for heating up the reaction materials and for carrying out the reaction at least in part, is effectively produced within the reaction vessel itself by passing electricity through the solid, electrical resistance elements to heat up, in turn, the urea and the reaction mixture disposed in the reactor in direct contact wtih the resistance elements. Heat will be generated in this manner in an amount sufficient for the desired purpose, and because of the nature of the heat generation, the required reaction heat will be uniformly distributed throughout the interior of the reaction vessel.

Of course, in addition to carbon and graphite, solid shaped bodies may be used, such as, for example silit, as is contemplated in the form of a silit resistor, i.e. a tubular resistance element made from a mixture of silicon carbide and silicon. The solid, electrical resistance material will be positioned in the desired form, shape, and magnitude, depending upon the shape of the reaction vessel and the reaction conditions contemplated, whereby upon applying a corresponding voltage to the individual heating elements of electrically resistant material, the necessary heat energy will be developed therewithin, and, in turn, transferred to the reaction medium. In place of specific heating elements passing through the melt or reaction medium, it is also possible to provide the electrical resistance material in the form of discrete particles in direct contact with one another and in contact with electrodes protruding through the walls of the reactor, or to provide the electrical resistance material in the form of a more or less regular structural arrangement, as for example would be the case with built-in installations similar to bell bottoms as used in distillation towers. In the latter instance, the built-in installations would take the form of electrodes or electrically conductive resistance material of the foregoing kind so that a connection between opposing electrodes may take place by the regular structural arrangement of electrode elements connecting the electrode terminals as well as by the use of discrete particle material. By the use of a regular arrangement, as for example in the form of a lattice or even a regular arrangement of individual discrete particles of the conductive electrical resistance material, individual zones of more convenient and more accurate control may be provided.

Therefore, in accordance with the invention, electrically conductive resistance elements may be provided for the direct heating of the reaction mixture since such electrodes are in direct contact with the reaction mixture. Current will flow through the electrical resistance material in a suitable manner between opposing electrodes or electrode terminals upon the application of a suitable voltage, preferably by way of an alternating current. If desired, the reactor wall or lining may serve as an electrode with a second electrode being immersed within the reaction mixture. In any cases, the heat required for a reaction is directly produced in the electrical resistance element itself, whereby the most direct and homogeneous heat transfer possible with respect to the melt will occur.

By reason of the specific form of heat generation in accordance with the present invention, therefore, as aforesaid, it is possible to avoid the use of a metallic lining for the reactor vessel interior walls, whereby it has become possible not only to line the reactor walls with non-corrosive and non-sensitive material, but also to omit the substantially more sensitive heat exchange apparatus within the reactor necessary under former circumstances.

The specific type of lining for the reactor walls depends upon substantially whether the reactor interior wall is to be used as an electrode for the current or not, especially in the case where the reactor contains discrete particle material or a regular arrangement or lattice of built-in installations. In the instance where such wall is to be used as an electrode, such materials are used, preferably, which conduct the electric current well, including in particular coal or carbon, graphite, carbonaceous materials, and the like, simple carbon in shaped, solid form being expedient for the purpose. Where the reactor walls are not used as an electrode, only such materials may be used as reactor lining which do not conduct the electric current to a greater degree than the current conducting electrically resistant heating element material itself. Appropriately, such non-conductor linings include insulator materials, such as those containing natural clays, i.e. materials containing silicon, such as kaolin, and the like, materials containing aluminum, such as corundum, and the like, materials containing magnesium, such as magnesite, and the like, etc.

Because of the provision for carrying out the melamine production using electrical current for heating purposes, it is now possible to carry on large scale industrial melamine production without being confronted with the usual corrosion difficulties. Of course, due to the fact that electricity is used for heating, the energy supplied for the process may be regulated very simply and with versatility. The energy transmission occurs substantially in more homogeneous form than by heating the reaction mixture through the reactor walls or by the use of a conventional heat exchange apparatus. By using built-in installations of the bell-bottom type, composed of the material forming the solid, electrical resistance heating elements in accordance with the invention, for example, the reaction to form melamine may be carried out in accordance with the counter-current principle, whereby not only more rapid and higher transformations, but also separate reaction paths for the liquid phase and the gaseous phase may be attained. As aforesaid, where urea in melt form is introduced into the upper portion of a vertical reactor, such urea because of its weight, will gravitate downwardly through the aforementioned built-in bottom elements or bell-bottoms, whereas the gases which form will flow upwardly in opposite direction, perhaps under the inclusion of additional ammonia for stabilization, the gases also passing through the built-in bottom elements or bell-bottoms. Advantageously, the urea is added at a point above the level of the reaction mixture, and the gas is added to the bottom portion of the reactor at a point above the outlet for the melamine. It has been found that the gases which leave the head of the reactor are free from condensed constituents, whereby it is possible to further work up this urea-free and melamine-free gaseous mixture consisting of ammonia and carbon dioxide, under intermediate cooling, such as with liquid ammonia, to a reaction temperature suitable for urea synthesis. While such urea synthesis may be carried out in a separate arrangement, such arrangement may be appropriately connected with the melamine reactor without loss of pressure in the over-all system. In this manner, urea formed in the urea synthesis of the ammonia and carbon dioxide gas, in accordance with conventional procedures, may be recycled to the melamine reactor to obtain a higher degree of efficiency for the over-all conversion.

In accordance with the last-mentioned form of execution of the process in accordance with the invention, the bell-bottoms or built-in installations in the reaction vessel should be produced, preferably, from non-metallic electrically conductive materials, and especially carbon. The individual bottom elements, of course, are conductively connected with another, for example by means of staggered bridging connectors, while the interior wall of the reaction vessel may be composed of non-metallic and non-conducting material, such as natural clay or the like. In this regard, the uppermost and lowermost built-in bell-bottom elements are inter-connected with electrodes introduced through the reactor walls for this purpose. Naturally, the individual bell-bottoms or built-in installations may take the form of sieve bottoms or the like in order to increase the flow and intensive inter-mixing between the counter-current ingredients.

With respect to the inclusion of discrete particle material in a random or regular arrangement, it will be appreciated that where a pair of electrodes are introduced into the reaction medium with the particle material in direct conductive contact therewith, the current will flow in a direction parallel to the flow direction of the reaction material through the reaction vessel. On the other hand, where additive material of less conductive nature than the discrete electrical resistance particle material is used in admixture with the discrete particle material, the electrode inner wall may be lined with carbon or graphite to form a counter electrode for a centrally disposed electrode immersed in the reaction mixture. In the latter instance, due to the geometrical configuration and arrangement, the electric current will flow in a direction perpendicular to the flow direction of the reactants in the reaction mixture.

In accordance with a preferred feature of the invention, where the reactor wall is lined with carbon or graphite to form one of the electrodes and where the discrete particle material is disposed between the centrally positioned electrode and the electrode wall lining, it is advantageous to admix such discrete electrically conductive resistance material in particle form with additive material of less conductive nature or nonconductive additive material, in particle form, whereby an increase or a decrease in conductivity may be produced along the direction of the flow of the reaction material. By this very simple innovation, it is possible to bring about a graduated energy control in the reaction vessel, so as to generate more energy particularly where more energy is required for the carrying out of the reaction, i.e. where less transformation from urea to melamine has occurred.

The usual conditions for the melamine synthesis are employed, of course, in accordance with the invention whereby the temperatures contemplated are achieved through electrical heating means. Specifically, temperatures between about 300 and 500° C., and preferably between about 350 and 450° C., with pressures within the range of between about 50 and 300 atmospheres absolute should be used. The time of stay of the reactants in the reactor will depend upon the particular conditions and generally ranges between about 2 minutes and 2 hours, whereby a continuous process is rendered possible. If necessary, the reaction may be favorably influenced by the addition of catalysts, in the known manner, such as those described in German Patent 955,685.

Referring to the drawing, various vertically extending reactors illustrate fundamental forms which may be used for carrying out the heating of urea under pressure in direct contact with a solid, electric resistance material which is utilized to generate heat as a function of the electrical resistance of such material to the current being passed therethrough. Thus, in all of the reactors shown in FIGURES 1–4, urea is added at a point above the level of the reaction mixture, whereas ammonia for stabilizing the system is added near the bottom of the reactor, but at a point above the lower end thereof where the melamine produced is drawn off. Ammonia and carbon dioxide in gaseous form are recovered from the head of the reactor for suitable further work up and possible recycling in the form of urea. In each instance, current is supplied from an external source through suitable electrode arrangements or heating elements in the form of solid, electrical resistance material in accordance with the invention.

In FIG. 1, an elongated U-shaped solid, electrical resistance heating element connected externally to a suitable source of alternating current of magnitude sufficient to cause the desired heating under the reaction conditions is provided. In FIG. 1, the heating of the reaction mixture is carried out by the electrical resistance heating of the heating element which, in turn, transfers the heat to the reaction mixture in direct contact therewith. The countercurrent flow of the urea and ammonia occurs in the reactor without the use of built-in installations, bell-bottoms, etc. The heating element consists of non-metallic material and suitably takes the form of a carbon heating element.

FIG. 2 shows a reaction vessel which is provided with discrete particle material of the electrically resistant type, such as carbon, such material forming a bed of particles in direct contact with one another, the electrical conduction therethrough being achieved by introducing an electrode through the upper end of the reactor and an electrodes through the lower end of the reactor, such that the inner ends of the electrodes are positioned in the bed of discrete particle material. The electrodes cause electric current to pass through the discrete particle material, which, in this case, is provided of regular size and form, whereby the heat generated therewithin is transferred to the melt in direct contact therewith.

In FIG. 3, the reactor is provided with an electrode lining such as a carbon lining while a centrally disposed electrode is inserted through the bottom wall of the reactor with discrete particle material occupying the main portion of the reactor in the form of a bed, and including not only electrically conductive resistance material in accordance with the invention but also an additive particle material of non-conductive nature. The electric circuit between the electrode lining and the centrally disposed electrode is completed through the bed by means of the discrete particle material having electrical conductance. All of said material is immersed within the reaction mixture in the same manner as the carbon particles and the electrode elements of FIG. 2. In accordance with the embodiment of FIG. 3, a graduated energy control may be carried out due to the mixture of non-conductive particle material with the electrical resistance material in accordance with the invention. Specifically, in the direction of flow of the reaction materials a change in the conductivity of the resistance material is encountered. Thus, in the direction of flow of the urea through the vertical reactor, a decrease in conductivity is experienced through the resistance material due to the fact that less material of this kind is disposed in the reactor along the lower extent thereof. On the other hand, a larger quantity of non-conductive material in particle form occupies the lower portion of the reactor in increasing ratio with respect to the discrete particle electrically conductive resistance material of the invention. Since less urea per se will be present in the reactor at the lower end thereof, the embodiment of FIG. 3 assures that the proper electrical current is conducted at any point along the extent of the bed for generating the desired heat to convert urea to melamine.

In FIG. 4, the reaction vessel is provided with several bell-bottom installations, staggered with respect to one another, along the extent of the reactor and interconnected with one another by means of bridging elements. The uppermost and lowermost bell-bottom installations are suitably connected with electrode terminals to complete the circuit. The bell-bottom installations of FIG. 4 are provided of suitable electrically conductive resistance material to define an electrical heating element in the reactor in the same manner as the electrode elements, electrode lining, heating elements, and discrete particle material of FIGS. 1, 2, and 3, as the case may be, are provided. The bell-bottoms employed in the embodiment of FIG. 4 are similar in nature to bell-bottoms employed in distillation towers. In the case of the embodiment of FIG. 4, an upper level for the liquid reaction mixture is not attained, but rather each of the bell-bottom installations serves to hold a portion or pool of reaction mixture for heating the same by direct contact with the electrical resistance material thereat, to attain the desired conversion. Of course, liquid reaction mixture will overflow from one bell-bottom installation to the next installation therebelow and the converted reaction mixture will be drawn off from the bottom of the reactor. In reverse direction, the counter-current flow of ammonia is achieved since the ammonia will bubble upwardly between the bell-bottom installations in the same manner as the ammonia and carbon dioxide which represent by-products of the reaction. These gaseous constituents are readily recovered from the head of the reactor. By the use of bell-bottoms an intensive intermixing of the various phases is assured while the counter-current principle is preserved as well as the plug or stopper principle which controls the downward flow and upward flow of reactants by reason of the built-in elements. Such built-in elements permit the reaction to be carried out with proper control of flow rates to obtain very definite times of stay.

In each instance, as will be appreciated by the artisan, the electrodes protruding through the reactor wall are insulatedly mounted on such wall and prevent leakage through the reactor thereat. Furthermore, where bell-bottom installations are used, these are similar in construction to the bell-bottoms used in distillation towers, such that more intensive intermixing of the various phases is assured and very definite control of the flow rate and residence time of the ingredients within the reactor.

The following examples are set forth for the purpose of illustrating the invention, and it is to be understood that the invention is not to be limited thereby:

*Example 1*

A pressure reactor is used having a volume of 21 liters, the reactor being made from $V_4A$ Extra steel, having a titanium overlayer. The inside wall of the reactor is lined with silit-stones having a thickness of 5 cm., i.e. a mixture of silicon and silicon carbide. In the reactor are positioned six parallel connecting heating elements of carbonaceous material, distributed over the entire length, such heating elements being introduced through the reactor wall in an insulated manner at the top end thereof. Into the upper portion of the reactor, six kg. of molten urea at a temperature of about 200° C. are pumped per hour. The six parallel heating elements are loaded with an alternating current at 12 volts and a maximum of 200 amperes, i.e. 50 Hz. (50 cycles per second). The current supply is regulated in such a manner that under the aforementioned load, a maximum temperature of 450° C. occurs in the reactor. Under these circumstances, a transformation into melamine of 96% by weight of the urea results where the reaction is carried out in continuous operation. The pressure release for the autogenous or self-generated pressure which occurs during the reaction may take place by way of a throttle valve, such that a pressure of about 105 atmospheres absolute pressure is maintained.

*Example 2*

The procedure of Example 1 is repeated, but instead of the solid structure parallel connected heating elements, the reactor is provided with a bed of carbonaceous material in discrete particle form having a particle magnitude between about 1.5 and 2 cm., the bed height being 1.80 meters. The reactor lining is the same as that in Example 1. Protruding through the two ends of the reactor, rod-shaped electrodes of electrographite are introduced in an insulated manner, the ends of the electrode being immersed into the bed of particle material to an extent of about 10 cm. from either end. Using a charge of 10 kg. per hour of urea, under otherwise similar conditions as set forth in Example 1, a transformation to melamine of 94% by weight is attained.

*Example 3*

The conversion of urea to melamine is carried out in accordance with the procedure of Example 1 using a reactor similar to that described in Example 1. In this case, however, the reactor is lined with graphite stones of 5 cm. thickness and a carbon electrode is introduced into the reactor from the lower end thereof so as to be concentrically positioned therewithin. A bed of discrete particle material is disposed in the reactor between the graphite stone lining and the centrally located carbon electrode so as to provide an electrical connection between such lining and electrode. The carbon electrode concentrically positioned within the reactor possesses a sufficient length so that the same extends over the entire extent of the bed. The necessary voltage is applied in this case between the reactor wall and the centrally disposed electrode and the bed consists of electrically conductive material in the form of coke particles mixed with non-conductive material in the form of gravel stones, such that in the direction from the upper portion of the bed to the lower portion thereof, an increase in electrical resistance is obtained. The urea is introduced into the upper portion of the reactor and flows downwardly therethrough. Accordingly, the greatest supply of heat is in the upper portion of the reactor where the degree of transformation is comparatively low. At an hourly load of 10 kg. of urea, under the conditions of Example 1, a transformation to melamine of 95% by weight is achieved.

What is claimed is:

1. Process for the production of melamine by heating urea under pressure, which comprises carrying out the heating of urea under pressure in direct contact with a solid, non-metallic corrosion-insensitive electrical resistance material, by passing an electric current through said electrical resistance material to generate heat therein as a function of the electrical resistance thereof to the current being passed therethrough, and transferring said heat to the urea by direct contact therewith to form melamine.

2. Process according to claim 1 wherein said material is carbon and the heating is carried out in a closed zone having a nonmetallic lining at a temperature between about 300–500° C. and a pressure between about 50–300 atmospheres.

3. Process according to claim 2 wherein said material is in the form of individual resistance particles in direct electrically conductive contact with one another disposed in a bath of said urea.

4. Process according to claim 3 wherein said material is admixed with individual additive particles of relatively less electrical conductivity than said resistance particles, the ratio of resistance particles to additive particles changing along the extent of said zone.

5. Process according to claim 3 wherein said material is admixed with individual non-conductive additive particles.

6. Process according to claim 2 wherein said material is in the form of a shaped element disposed in a bath of said urea.

7. Process according to claim 2 wherein the electric current is alternating current.

8. Process according to claim 7 wherein the heating is carried out in the presence of ammonia by passing urea along a reaction path in countercurrent to the ammonia, and recovering the melamine produced.

9. Process according to claim 8 wherein the heating is carried out under pressure in the presence of a metallic catalyst selected from the group consisting of base metals, base metal oxides, and base metal salts.

10. Process for the production of melamine by heating urea under pressure, which comprises carrying out the heating of urea under pressure in a closed zone having a non-metallic lining in the presence of ammonia, and in direct contact with a solid, non-metallic corrosion-insensitive electrical resistance material within said zone, by passing an electric current through said electrical resistance material to generate heat therein as a function of the electrical resistance thereof to the current being passed therethrough, and transferring said heat to the urea by direct contact therewith to form melamine, carbon dioxide and ammonia, and collecting the melamine in liquid form separately from the carbon dioxide and ammonia in gaseous form the heating being carried out at a temperature between about 300–500° C. and a pressure between about 50–300 atmospheres for a period of from about 2 minutes to 2 hours, and the carbon dioxide and ammonia in gaseous form being recovered, cooled without change in pressure, and converted into urea, and the urea formed thereby recycled back to the melamine process step.

11. Process according to claim 4 wherein the heating is carried out while passing the urea along a reaction path, the amount of resistance particles decreases and the amount of additive particles increasing in the direction of flow of said urea, thereby resulting in an increase in the overall resistance to passage of electric current therealong and a corresponding increase in the heat generated.

References Cited in the file of this patent

UNITED STATES PATENTS

| | | |
|---|---|---|
| 1,400,959 | Koetschet | Dec. 20, 1921 |
| 2,485,276 | Gerbes | Oct. 18, 1949 |
| 2,566,224 | Mackay | Aug. 28, 1951 |
| 2,575,497 | Mackay et al. | Nov. 20, 1951 |
| 2,972,614 | Disteldorf | Feb. 21, 1961 |

FOREIGN PATENTS

| | | |
|---|---|---|
| 540,286 | Canada | Apr. 30, 1957 |
| 792,604 | Great Britain | Apr. 2, 1958 |

UNITED STATES PATENT OFFICE
CERTIFICATE OF CORRECTION

Patent No. 3,122,541  February 25, 1964

Karl Schmitt et al.

It is hereby certified that error appears in the above numbered patent requiring correction and that the said Letters Patent should read as corrected below.

Column 3, line 53, for "malamine" read -- melamine --; column 6, line 27, before "heating" insert -- the --; column 7, line 48, after "absolute" insert -- , and preferably around 100 to 105 atmospheres absolute --; column 8, line 18, for "trodes" read -- trode --.

Signed and sealed this 30th day of June 1964.

(SEAL)
Attest:

ERNEST W. SWIDER
Attesting Officer

EDWARD J. BRENNER
Commissioner of Patents